US012783939B2

(12) United States Patent
Kumar et al.

(10) Patent No.: US 12,783,939 B2
(45) Date of Patent: Nov. 3, 2026

(54) UNIFIED SAMPLE REWEIGHTING FRAMEWORK FOR LEARNING WITH NOISY DATA AND FOR LEARNING DIFFICULT EXAMPLES OR GROUPS

(71) Applicant: Google LLC, Mountain View, CA (US)

(72) Inventors: Abhishek Kumar, Milpitas, CA (US); Ehsan Amid, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1001 days.

(21) Appl. No.: 17/816,197

(22) Filed: Jul. 29, 2022

(65) Prior Publication Data

US 2023/0044078 A1 Feb. 9, 2023

Related U.S. Application Data

(60) Provisional application No. 63/227,390, filed on Jul. 30, 2021.

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 2008/0086432 A1* | 4/2008 | Schmidtler | ........... | G06F 16/353 706/14 |
| 2019/0188573 A1* | 6/2019 | Lehman | ................. | G06N 3/084 |
| 2019/0220733 A1* | 7/2019 | Fisher | ..................... | G06N 3/088 |
| 2021/0004670 A1* | 1/2021 | Tripathi | ................. | G06N 3/084 |

(Continued)

OTHER PUBLICATIONS

Póczos, B., Xiong, L., & Schneider, J. (Feb. 2012). Nonparametric divergence estimation with applications to machine learning on distributions. arXiv preprint arXiv:1202.3758. (Year: 2012).*

(Continued)

*Primary Examiner* — Michael J Huntley
*Assistant Examiner* — Maggie Thanh Maido
(74) *Attorney, Agent, or Firm* — DORITY & MANNING, P.A.

(57) ABSTRACT

A method includes receiving training data for a machine learning model, the training data comprising a plurality of training examples and a corresponding plurality of labels. The method further includes dividing the training data into a plurality of training batches. For each training batch of the plurality of training batches, the method additionally includes learning a weight for each training example in the training batch that minimizes a sum of weighted losses for the training batch subject to a divergence constraint, where the divergence constraint limits a divergence of the learned weights for the training batch from a reference distribution, where the divergence is determined according to a chosen divergence measure. The method also includes training the machine learning model with each training batch of the plurality of training batches using the learned weight for each training example in the training batch. The method additionally includes providing the trained machine learning model.

20 Claims, 9 Drawing Sheets

(56) References Cited

U.S. PATENT DOCUMENTS

| | | | | |
|---|---|---|---|---|
| 2021/0125071 | A1* | 4/2021 | Ren | G06N 3/04 |
| 2021/0142181 | A1* | 5/2021 | Liu | G06N 3/045 |
| 2022/0172101 | A1* | 6/2022 | Das | G06N 5/04 |
| 2023/0024884 | A1* | 1/2023 | Casserini | G06F 18/217 |

OTHER PUBLICATIONS

Iqbal, A., & Seghouane, A. K. (Nov. 2019). An $\alpha $-divergence-based approach for robust dictionary learning. IEEE Transactions on Image Processing, 28(11), 5729-5739. (Year: 2019).*
Wang, J., Zhang, T., Liu, S., Chen, P. Y., Xu, J., Fardad, M., & Li, B. (Sep. 2019). Towards a unified min-max framework for adversarial exploration and robustness. (Year: 2019).*
Maretic, H. P., & Frossard, P. (Mar. 2020). Graph Laplacian mixture model. IEEE Transactions on Signal and Information Processing over Networks, 6, 261-270. (Year: 2020).*
Yu, Q., Hashimoto, A., & Ushiku, Y. (Apr. 2021). Divergence optimization for noisy universal domain adaptation. In Proceedings of the IEEE/CVF conference on computer vision and pattern recognition (pp. 2515-2524). (Year: 2021).*
Englesson, E., & Azizpour, H. (May 2021). Generalized jensen-shannon divergence loss for learning with noisy labels. Advances in Neural Information Processing Systems, 34, 30284-30297. (Year: 2021).*
Byrd, J., & Lipton, Z. (May 2019). What is the effect of importance weighting in deep learning?. In International conference on machine learning (pp. 872-881). PMLR. (Year: 2019).*
Dimitriadis et al., "Federated Transfer Learning with Dynamic Gradient Aggregation", arXiv:2008.02452v1, Aug. 6, 2020, 9 pages.
Jiang et al., "MentorNet: Learning Data-Driven Curriculum for Very Deep Neural Networks on Corrupted Labels", Thirty-Fifth International Conference on Machine Learning, Stockholm, Sweden, Jul. 10-14, 2018, 10 pages.
Lin et al., "Focal Loss for Dense Object Detection", 2017 Institute of Electrical and Electronics Engineers International Conference on Computer Vision, Venice, Italy, Oct. 22-29, 2017, 9 pages.
Ren et al., "Learning to Reweight Examples for Robust Deep Learning", arXiv:1803.09050v3, May 5, 2019, 13 pages.
Saxena et al., "Data Parameters: A New Family of Parameters for Learning a Differentiable Curriculum", Thirty-Third Conference on Neural Information Processing Systems, Vancouver, Canada, Dec. 8-14, 2019, 11 pages.
Zhang et al., "Robust Principal Component Analysis with Adaptive Neighbors", Thirty-Third Conference on Neural Information Processing Systems, Vancouver, Canada, Dec. 8-14, 2019, 9 pages.

* cited by examiner

UNIFIED SAMPLE REWEIGHTING FRAMEWORK FOR LEARNING WITH NOISY DATA AND FOR LEARNING DIFFICULT EXAMPLES OR GROUPS

CROSS-REFERENCE TO RELATED APPLICATIONS

The present application is a non-provisional patent application claiming priority to U.S. Provisional Patent Application No. 63/227,390, filed Jul. 30, 2021, the contents of which are hereby incorporated by reference.

BACKGROUND

Deep neural networks have been quite successful in driving impressive performance gains in several real-world applications. However, this success primarily relies on the availability of clean training data, and overparameterized deep networks have the ability to easily overfit to noisy or corrupted labels. Consequently, training with noisy labels often leads to degradation in generalization performance on clean test data. Unfortunately, noisy labels can naturally appear in several real world scenarios, such as labels obtained from the internet, noisy human annotations, automatic labels obtained from legacy rule based systems or from machine learned systems trained on obsolete or shifted data distributions, etc. This brings up the need for designing more effective methods for learning with noisy labels.

SUMMARY

In one aspect, a computer-implemented method is provided. The method includes receiving training data for a machine learning model, the training data comprising a plurality of training examples and a corresponding plurality of labels. The method further includes dividing the training data into a plurality of training batches. For each training batch of the plurality of training batches, the method additionally includes learning a weight for each training example in the training batch that minimizes a sum of weighted losses for the training batch subject to a divergence constraint, where the divergence constraint limits a divergence of the learned weights for the training batch from a reference distribution, where the divergence is determined according to a chosen divergence measure. The method also includes training the machine learning model with each training batch of the plurality of training batches using the learned weight for each training example in the training batch. The method additionally includes providing the trained machine learning model.

In another aspect, a computing system is disclosed comprising one or more processors and a non-transitory computer readable medium storing program instructions executable by the one or more processors to cause performance of operations. The operations include receiving training data for a machine learning model, the training data comprising a plurality of training examples and a corresponding plurality of labels. The operations further include dividing the training data into a plurality of training batches. For each training batch of the plurality of training batches, the operations additionally include learning a weight for each training example in the training batch that minimizes a sum of weighted losses for the training batch subject to a divergence constraint, where the divergence constraint limits a divergence of the learned weights for the training batch from a reference distribution, where the divergence is determined according to a chosen divergence measure. The operations also include training the machine learning model with each training batch of the plurality of training batches using the learned weight for each training example in the training batch. The operations additionally include providing the trained machine learning model.

In another aspect, a non-transitory computer readable medium storing program instructions executable by one or more processors is provided to cause performance of operations. The operations include receiving training data for a machine learning model, the training data comprising a plurality of training examples and a corresponding plurality of labels. The operations further include dividing the training data into a plurality of training batches. For each training batch of the plurality of training batches, the operations additionally include learning a weight for each training example in the training batch that minimizes a sum of weighted losses for the training batch subject to a divergence constraint, where the divergence constraint limits a divergence of the learned weights for the training batch from a reference distribution, where the divergence is determined according to a chosen divergence measure. The operations also include training the machine learning model with each training batch of the plurality of training batches using the learned weight for each training example in the training batch. The operations additionally include providing the trained machine learning model.

In another aspect, a computing device is provided. The computing device includes means for receiving training data for a machine learning model, the training data comprising a plurality of training examples and a corresponding plurality of labels. The computing device further includes means for dividing the training data into a plurality of training batches. For each training batch of the plurality of training batches, the computing device additionally includes means for learning a weight for each training example in the training batch that minimizes a sum of weighted losses for the training batch subject to a divergence constraint, where the divergence constraint limits a divergence of the learned weights for the training batch from a reference distribution, where the divergence is determined according to a chosen divergence measure. The computing device also includes means for training the machine learning model with each training batch of the plurality of training batches using the learned weight for each training example in the training batch. The computing device additionally includes means for providing the trained machine learning model.

In another aspect, a computer-implemented method is provided. The method includes receiving training data for a machine learning model, the training data comprising a plurality of training examples and a corresponding plurality of labels. The method further includes dividing the training data into a plurality of training batches. For each training batch of the plurality of training batches, the method additionally includes learning a weight for each training example in the training batch that minimizes a sum of weighted losses over model parameters and maximizes the sum of weighted losses over example weights or group weights for the training batch subject to a divergence constraint, where the divergence constraint limits a divergence of the weights for the training batch from a reference distribution, where the divergence is determined according to a chosen divergence measure. The method also includes training the machine learning model with each training batch of the plurality of training batches using the learned weight for each training example in the training batch. The method additionally includes providing the trained machine learning model.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
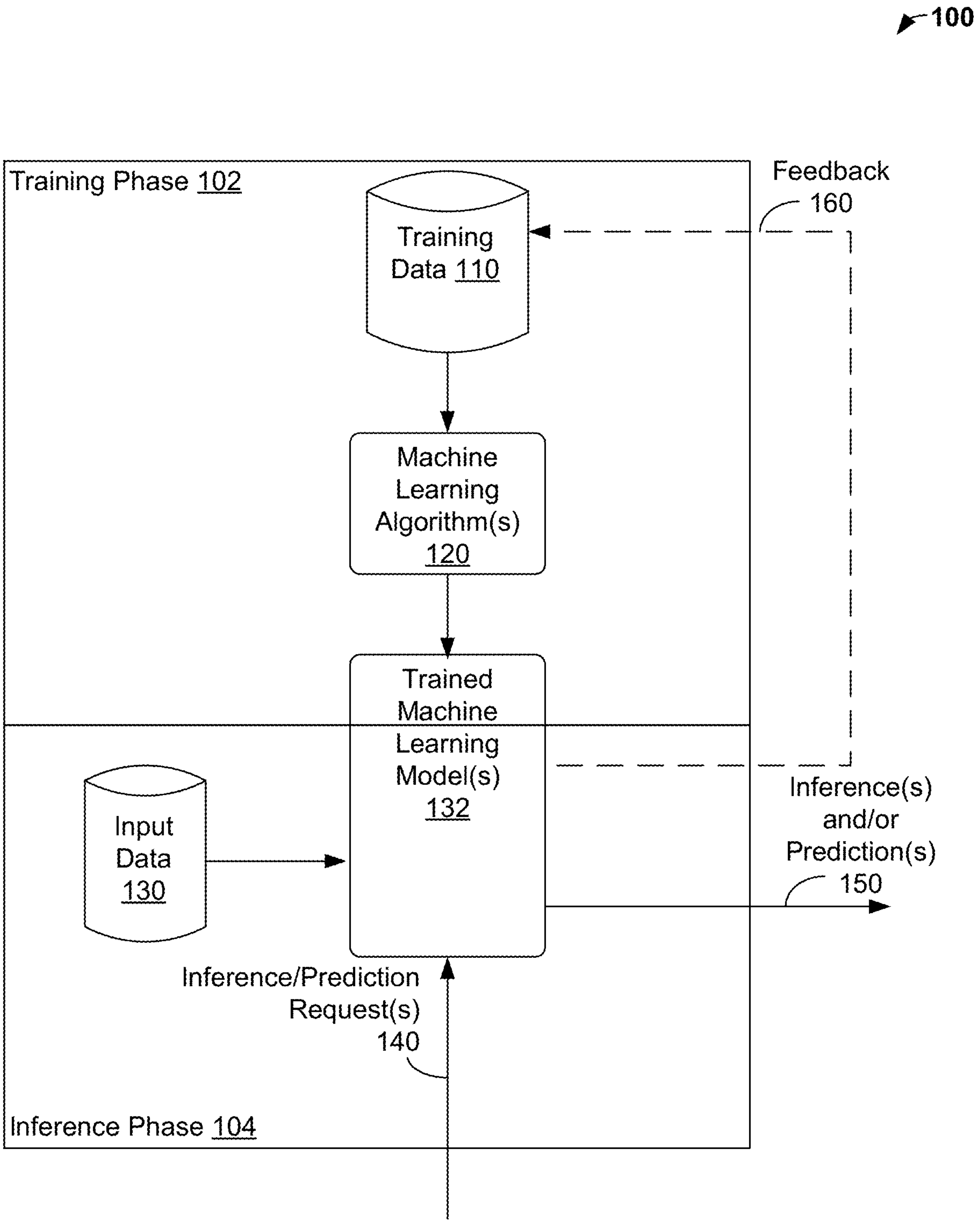
FIG. 1 is a diagram illustrating training and inference phases of a machine learning model, in accordance with example embodiments.

Example methods described herein allow for dynamically assigning importance weights to each instance and class label in a minibatch of training data for use in training a machine learning model, such as a neural network. A class of constrained optimization problems is described where the deviation of these importance weights from a reference weight distribution is controlled. In some examples, the reference weight distribution is chosen to be a uniform distribution. In other examples, group prior information indicative of likelihood of label noise may be available for some or all of the training examples, and this group prior information may be leveraged to select a different reference weight distribution. The divergence of the importance weights from the reference weight distribution is measured by a divergence measure of choice. Simple closed form updates are described for the importance weights for several common divergence measures, such as alpha-divergence, which include KL-divergence and reverse-KL divergence as special cases. Further example methods involve using these importance weights to generate mixed up minibatches of training data for training a machine learning model, yielding significant empirical improvements.

Some example methods described herein are directed to training a machine learning model such as a neural network when confronted with noisy label data within training data. Such noisy label data may result from inaccurate human annotations and/or inaccurate machine-generated annotations (e.g., legacy rule based systems or machine learned systems trained on obsolete or shifted data distributions). Further example methods described herein are separately directed to training a machine learning model such as a neural network when confronted with training data that includes some particularly difficult examples for which successful model performance is desired. In contrast to earlier described methods which assign weights to account for label noise in training, these further example methods instead assign weights to improve a model's performance on examples which are inherently more difficult for the model to learn.

Further examples described herein are directed to scenarios where data can be naturally partitioned into groups. A goal in such examples may be to learn a robust classifier that works well on all these groups. This grouping information can be available as part of metadata (e.g., face images that have skin or hair color as metadata). In such cases, example embodiments described herein are configured to ensure or encourage equity in the performance of the learned model over different groups, instead of optimizing for the average performance over full dataset. Such examples may therefore accommodate situations where training a model is more difficult for certain groups of training examples as compared to other groups of training examples.

Use Cases

Example methods described herein may be applied to a wide range of scenarios that may be encountered in the context of machine learning systems. Some examples involved supervised machine learning where the training data includes labeled examples. Some of the labels may be associated with varying amounts of noise. In the multi-class setting, it may be necessary to classify examples among multiple different classes (e.g., identifying images of dogs vs images of cats). In some examples, noise may result from human mislabeling. In other examples, noise may result from machine-generated mislabeling. For instance, inaccurate labels may be generated from applying a legacy heuristics based system or a machine learned system that has been trained on legacy data which has a different distribution than current data. In general, existing deployed systems in a variety of applications may provide relevant and necessary training data that is imperfect. Some example applications may refer to such training data as "silver" training data, which may be considered less trustworthy than "gold" training data. However, such gold training data may not be easily available in sufficient quantities to allow for machine learning model training.

Some examples described herein may be incorporated into a system that provides machine learning as a service to users. For instance, a user may have developed a proposed machine learning model as well as available training data for the model. However, the training data may include enough noise to make traditional training insufficient to provide an accurate trained model. In such examples, the user may be provided with an interface to provide information about a desired model, as well as training examples. After collecting relevant information through the interface, the system may use the methods described herein to weight instances within training batches of training data in order to train the model in a more accurate way. A trained model may then be provided back to the user via the interface as part of the service. In further examples, the interface may prompt the user with additional information to facilitate the training process. For instance, the user may be prompted for prior accuracy weighting information indicating expected accuracy of different training examples. The prior accuracy weighting information may be used to generate a reference weight distribution as described herein. In further examples, the user may be prompted for expected class distribution information, which may be used to help select alpha or a different parameter as described herein. Other examples of gathering prior information from a user to facilitate the provision of machine learning as a service are also contemplated.

Examples described herein may be applied to a variety of underlying machine learning models to be trained. In particular, as long as a loss function can be defined, the process may be agnostic to the model architecture and loss function. The examples are further applicable to a variety of types of training data. Some examples described herein involve image data (e.g., classifying objects in images). Some examples described herein further involve mixing up of image data to generate additional training data. For instance, instances within a minibatch for which higher weights are assigned by the methods described herein may be weighted more than other examples when sampling and/or mixing example images for training. Other example applications may instead include video data, audio data, text data, and a variety of alternatives for the training data and input(s) to the machine learning model.

Some examples described herein may be directed to handling difficult-to-learn examples or difficult-to-learn groups in training data instead of noisy data. The specific models and applications for which difficult-to-learn examples or difficult-to-learn groups are a focus may be different than for noisy examples. For instance, in the context of computer vision, if a model is trained to differentiate between pictures of cats and pictures of dogs, the model may have a particularly difficult time differentiating blurry pictures or pictures where the cat or dog appears far in the distance. Example methods described herein upgrade the weight assigned to such difficult examples, which may facilitate faster training (e.g., training with less training data needed) of a model. Further examples may involve increasing the weight assigned to difficult-to-learn examples or difficult-to-learn groups for other types of training data, such as video data, audio data, or text data. For instance, a further example involves handling text sentences with negative sentiments that do not use any negative sentiment words in the task of sentiment classification.

Technical Improvements

Some examples described herein provide a benefit of trained machine learning models that produce more accurate outputs (e.g., more accurate class labels). In particular, techniques are described for addressing the problem of label noise in training data. This has a potential to have positive downstream implications in yielding better performing machine learning models.

Some examples described herein further provide a benefit of reduced memory storage requirements. In particular, some of the methods described herein do not need to maintain the weights across the whole training set. Accordingly, the methods may be executed with little computational or memory overhead as compared to alternative cross-entropy loss methods. This is an added benefit compared to some alternative methods that need to keep a record of importance weights over the complete training set which results in increased overhead, particularly for large datasets. For instance, in the methods described herein, if a minibatch size of 200 examples is used, necessary memory storage may be limited to memory storage sufficient to store information about 200 training examples. This benefit may be particularly significant for applications that involve many different types of examples. For instance, an example application may involve one million different types of training examples for which weights may need to be maintained using alternative methods, which may be more computationally expensive and cumbersome as compared to methods described herein.

Some examples described herein may further provide benefits associated with faster training of a machine learning model. For instance, some such examples may involve prioritizing difficult-to-learn examples or difficult-to-learn groups. By prioritizing difficult-to-learn examples or difficult-to-learn groups, less training data may be needed to train a model. Accordingly, a model may be trained to produce accurate results (e.g., accurate classifications of training examples) with less training data and requiring fewer computations and less computation time to train an associated machine learning model.

FIGURES

FIG. 1 shows diagram 100 illustrating a training phase 102 and an inference phase 104 of trained machine learning model(s) 132, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 1 shows training phase 102 where one or more machine learning algorithms 120 are being trained on training data 110 to become trained machine learning model(s) 132. Then, during inference phase 104, trained machine learning model(s) 132 can receive input data 130 and one or more inference/prediction requests 140 (perhaps as part of input data 130) and responsively provide as an output one or more inferences and/or prediction(s) 150.

As such, trained machine learning model(s) 132 can include one or more models of one or more machine learning algorithms 120. Machine learning algorithm(s) 120 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 120 may be supervised or unsupervised, and may implement any suitable combination of online and offline learning.

In some examples, machine learning algorithm(s) 120 and/or trained machine learning model(s) 132 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 120 and/or trained machine learning model(s) 132. In some examples, trained machine learning model(s) 132 can be trained, reside and execute to provide inferences on a particular computing device, and/or otherwise can make inferences for the particular computing device.

During training phase 102, machine learning algorithm(s) 120 can be trained by providing at least training data 110 as training input using unsupervised, supervised, semi-supervised, and/or reinforcement learning techniques. Unsupervised learning involves providing a portion (or all) of training data 110 to machine learning algorithm(s) 120 and machine learning algorithm(s) 120 determining one or more output inferences based on the provided portion (or all) of training data 110. Supervised learning involves providing a portion of training data 110 to machine learning algorithm(s) 120, with machine learning algorithm(s) 120 determining one or more output inferences based on the provided portion of training data 110, and the output inference(s) are either accepted or corrected based on correct results associated with training data 110. In some examples, supervised learning of machine learning algorithm(s) 120 can be governed by a set of rules and/or a set of labels for the training input, and the set of rules and/or set of labels may be used to correct inferences of machine learning algorithm(s) 120. Individual instances of training data 110 may be weighted according to methods described herein.

Semi-supervised learning involves having correct results for part, but not all, of training data 110. During semi-supervised learning, supervised learning is used for a portion of training data 110 having correct results, and unsupervised learning is used for a portion of training data 110 not having correct results. Reinforcement learning involves machine learning algorithm(s) 120 receiving a reward signal regarding a prior inference, where the reward signal can be a numerical value. During reinforcement learning, machine learning algorithm(s) 120 can output an inference and receive a reward signal in response, where machine learning algorithm(s) 120 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 120 and/or trained machine learning model(s) 132 can be trained using other machine learning techniques, including but not limited to, incremental learning and curriculum learning.

In some examples, machine learning algorithm(s) 120 and/or trained machine learning model(s) 132 can use transfer learning techniques. For example, transfer learning techniques can involve trained machine learning model(s) 132 being pre-trained on one set of data and additionally trained using training data 110. More particularly, machine learning algorithm(s) 120 can be pre-trained on data from one or more computing devices and a resulting trained machine learning model provided to computing device CD1, where CD1 is intended to execute the trained machine learning model during inference phase 104. Then, during training phase 102, the pre-trained machine learning model can be additionally trained using training data 110, where training data 110 can be derived from kernel and non-kernel data of computing device CD1. This further training of the machine learning algorithm(s) 120 and/or the pre-trained machine learning model using training data 110 of CD1's data can be performed using either supervised or unsupervised learning. Once machine learning algorithm(s) 120 and/or the pre-trained machine learning model has been trained on at least training data 110, training phase 102 can be completed. The trained resulting machine learning model can be utilized as at least one of trained machine learning model(s) 132.

In particular, once training phase 102 has been completed, trained machine learning model(s) 132 can be provided to a computing device, if not already on the computing device. Inference phase 104 can begin after trained machine learning model(s) 132 are provided to computing device CD1.

During inference phase 104, trained machine learning model(s) 132 can receive input data 130 and generate and output one or more corresponding inferences and/or prediction(s) 150 about input data 130. As such, input data 130 can be used as an input to trained machine learning model(s) 132 for providing corresponding inference(s) and/or prediction (s) 150 to kernel components and non-kernel components. For example, trained machine learning model(s) 132 can generate inference(s) and/or prediction(s) 150 in response to one or more inference/prediction requests 140. In some examples, trained machine learning model(s) 132 can be executed by a portion of other software. For example, trained machine learning model(s) 132 can be executed by an inference or prediction daemon to be readily available to provide inferences and/or predictions upon request. Input data 130 can include data from computing device CD1 executing trained machine learning model(s) 132 and/or input data from one or more computing devices other than CD1.

Input data 130 can include training data described herein. Other types of input data are possible as well.

Inference(s) and/or prediction(s) 150 can include task outputs, numerical values, and/or other output data produced by trained machine learning model(s) 132 operating on input data 130 (and training data 110). In some examples, trained machine learning model(s) 132 can use output inference(s) and/or prediction(s) 150 as input feedback 160. Trained machine learning model(s) 132 can also rely on past inferences as inputs for generating new inferences.

After training, the trained version of the neural network can be an example of trained machine learning model(s) 132. In this approach, an example of the one or more inference/prediction request(s) 140 can be a request to predict a classification for an input training example and a corresponding example of inferences and/or prediction(s) 150 can be a predicted classification output. In some examples, individual instances of training data 110 may also have weights assigned for various possible classes as further described herein.

In some examples, one computing device CD_SOLO can include the trained version of the neural network, perhaps after training. Then, computing device CD_SOLO can receive a request to predict a task output, and use the trained version of the neural network to predict the task output.

In some examples, two or more computing devices CD_CLI and CD_SRV can be used to provide outputs; e.g., a first computing device CD_CLI can generate and send requests to predict a task output to a second computing device CD_SRV. Then, CD_SRV can use the trained version of the neural network, to predict the task output, and respond to the requests from CD_CLI for the output class. Then, upon reception of responses to the requests, CD_CLI can provide the requested output.

Figure 2:
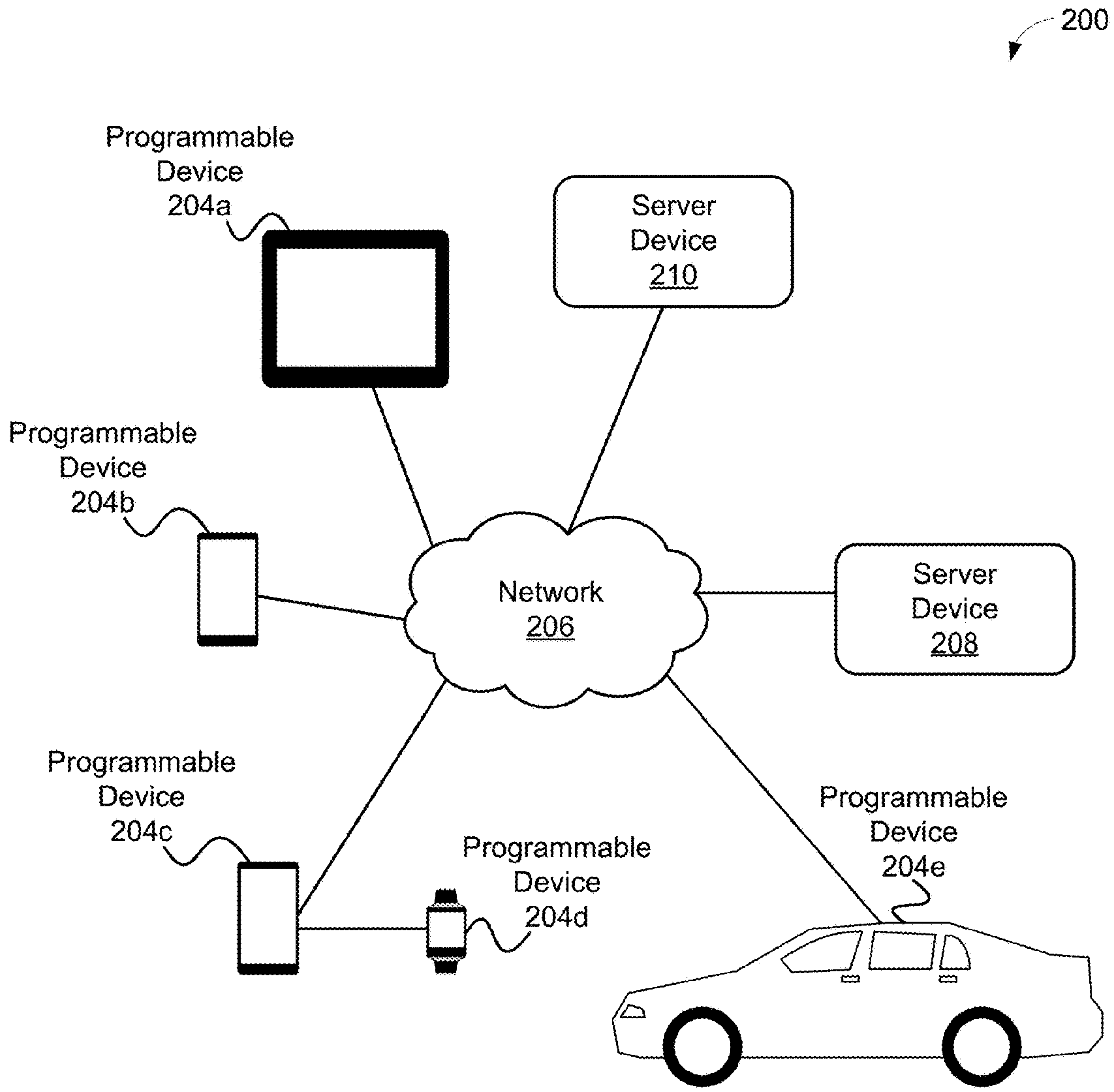
FIG. 2 depicts a distributed computing architecture, in accordance with example embodiments.

FIG. 2 depicts a distributed computing architecture 200, in accordance with example embodiments. Distributed computing architecture 200 includes server devices 208, 210 that are configured to communicate, via network 206, with programmable devices 204*a*, 204*b*, 204*c*, 204*d*, 204*e*. Network 206 may correspond to a local area network (LAN), a wide area network (WAN), a WLAN, a WWAN, a corporate intranet, the public Internet, or any other type of network configured to provide a communications path between networked computing devices. Network 206 may also correspond to a combination of one or more LANs, WANs, corporate intranets, and/or the public Internet.

Although FIG. 2 only shows five programmable devices, distributed application architectures may serve tens, hundreds, or thousands of programmable devices. Moreover, programmable devices 204*a*, 204*b*, 204*c*, 204*d*, 204*e* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 204*a*, 204*b*, 204*c*, 204*e*, programmable devices can be directly connected to network 206. In other examples, such as illustrated by programmable device 204*d*, programmable devices can be indirectly connected to network 206 via an associated computing device, such as programmable device 204*c*. In this example, programmable device 204*c* can act as an associated computing device to pass electronic communications between programmable device 204*d* and network 206. In other examples, such as illustrated by programmable device 204*e*, a computing device can be part of and/or inside a vehicle, such as a car, a truck, a bus, a boat or ship, an airplane, etc. In other examples not shown in FIG. 2, a programmable device can be both directly and indirectly connected to network 206.

Server devices 208, 210 can be configured to perform one or more services, as requested by programmable devices 204*a*-204*e*. For example, server device 208 and/or 210 can provide content to programmable devices 204*a*-204*e*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well. Some examples described herein involve machine learning content, such as a trained machine learning model provided as part of machine learning as a service.

As another example, server device 208 and/or 210 can provide programmable devices 204*a*-204*e* with access to software for database, search, computation, graphical, audio, video, World Wide Web/Internet utilization, and/or other functions. Many other examples of server devices are possible as well.

Figure 3:
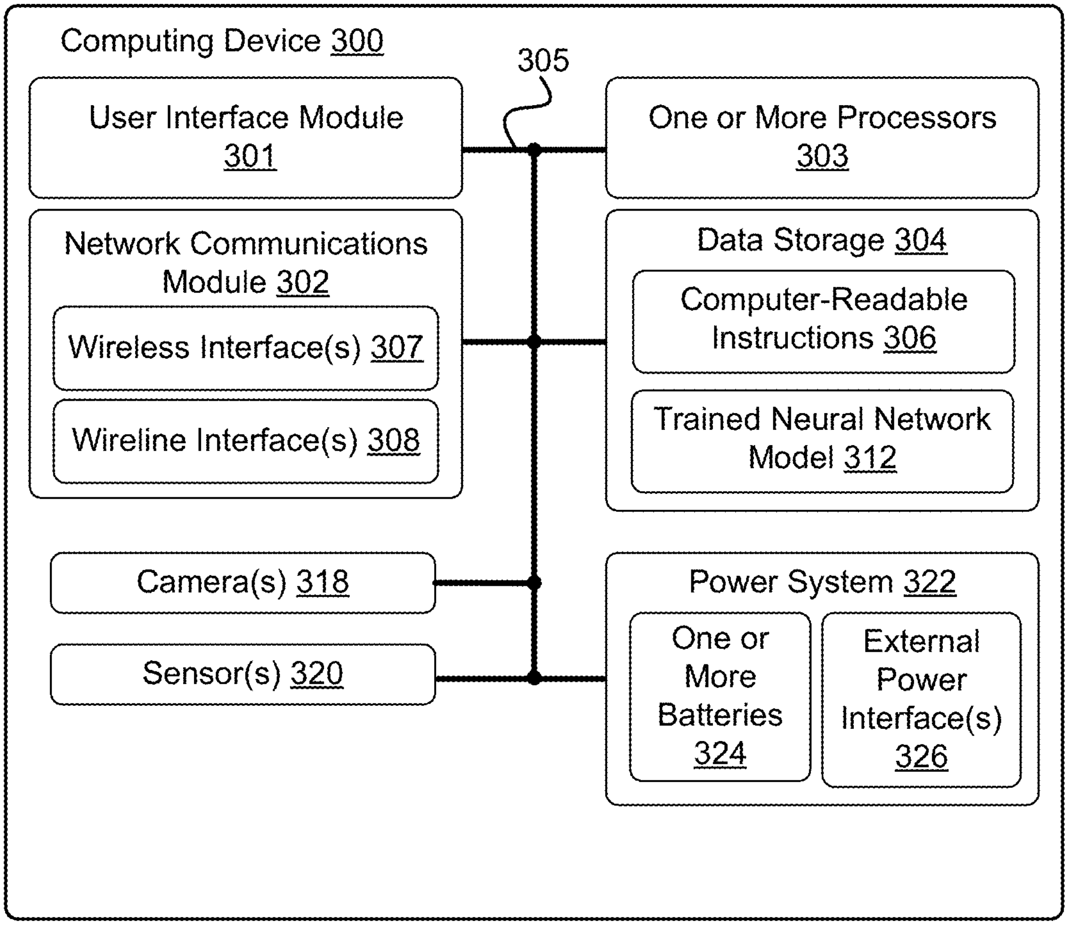
FIG. 3 is a block diagram of a computing device, in accordance with example embodiments.

FIG. 3 is a block diagram of an example computing device 300, in accordance with example embodiments. In particular, computing device 300 shown in FIG. 3 can be configured to perform at least one function of and/or related to trained machine learning model(s) 132, and/or method 500 or method 600.

Computing device 300 may include a user interface module 301, a network communications module 302, one or more processors 303, data storage 304, one or more camera(s) 318, one or more sensors 320, and power system 322, all of which may be linked together via a system bus, network, or other connection mechanism 305.

User interface module 301 can be operable to send data to and/or receive data from external user input/output devices. For example, user interface module 301 can be configured to send and/or receive data to and/or from user input devices such as a touch screen, a computer mouse, a keyboard, a keypad, a touch pad, a trackball, a joystick, a voice recognition module, and/or other similar devices. User interface module 301 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 301 can also be configured to generate audible outputs, with devices such as a speaker, speaker jack, audio output port, audio output device, earphones, and/or other similar devices. User interface module 301 can further be configured with one or more haptic devices that can generate haptic outputs, such as vibrations and/or other outputs detectable by touch and/or physical contact with computing device 300. In some examples, user interface module 301 can be used to provide a graphical user interface (GUI) for utilizing computing device 300, such as, for example, a graphical user interface of a mobile phone device.

Network communications module 302 can include one or more devices that provide one or more wireless interface(s) 307 and/or one or more wireline interface(s) 308 that are configurable to communicate via a network. Wireless interface(s) 307 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 308 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 302 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 303 can include one or more general purpose processors, and/or one or more special purpose processors (e.g., digital signal processors, tensor processing units (TPUs), graphics processing units (GPUs), application specific integrated circuits, etc.). One or more processors 303 can be configured to execute computer-readable instructions 306 that are contained in data storage 304 and/or other instructions as described herein.

Data storage 304 can include one or more non-transitory computer-readable storage media that can be read and/or accessed by at least one of one or more processors 303. The one or more computer-readable storage media can include volatile and/or non-volatile storage components, such as optical, magnetic, organic or other memory or disc storage, which can be integrated in whole or in part with at least one of one or more processors 303. In some examples, data storage 304 can be implemented using a single physical device (e.g., one optical, magnetic, organic or other memory or disc storage unit), while in other examples, data storage 304 can be implemented using two or more physical devices.

Data storage 304 can include computer-readable instructions 306 and perhaps additional data. In some examples, data storage 304 can include storage required to perform at least part of the herein-described methods, scenarios, and techniques and/or at least part of the functionality of the herein-described devices and networks. In some examples, data storage 304 can include storage for a trained neural network model 312 (e.g., a model of trained neural networks such as trained machine learning model(s) 132). In particular of these examples, computer-readable instructions 306 can include instructions that, when executed by one or more processors 903, enable computing device 300 to provide for some or all of the functionality of trained neural network model 312.

In some examples, computing device 300 can include one or more camera(s) 318. Camera(s) 318 can include one or more image capture devices, such as still and/or video cameras, equipped to capture light and record the captured light in one or more images; that is, camera(s) 318 can generate image(s) of captured light. The one or more images can be one or more still images and/or one or more images utilized in video imagery. Camera(s) 318 can capture light and/or electromagnetic radiation emitted as visible light, infrared radiation, ultraviolet light, and/or as one or more other frequencies of light.

In some examples, computing device 300 can include one or more sensors 320. Sensors 320 can be configured to measure conditions within computing device 300 and/or conditions in an environment of computing device 300 and provide data about these conditions. For example, sensors 320 can include one or more of: (i) sensors for obtaining data about computing device 300, such as, but not limited to, a thermometer for measuring a temperature of computing device 300, a battery sensor for measuring power of one or more batteries of power system 322, and/or other sensors measuring conditions of computing device 300; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 300, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 300, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 300, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 320 are possible as well.

Power system 322 can include one or more batteries 324 and/or one or more external power interfaces 326 for providing electrical power to computing device 300. Each battery of the one or more batteries 324 can, when electrically coupled to the computing device 300, act as a source of stored electrical power for computing device 300. One or more batteries 324 of power system 322 can be configured to be portable. Some or all of one or more batteries 324 can be readily removable from computing device 300. In other examples, some or all of one or more batteries 324 can be internal to computing device 300, and so may not be readily removable from computing device 300. Some or all of one or more batteries 324 can be rechargeable. For example, a rechargeable battery can be recharged via a wired connection between the battery and another power supply, such as by one or more power supplies that are external to computing device 300 and connected to computing device 300 via the one or more external power interfaces. In other examples, some or all of one or more batteries 324 can be non-rechargeable batteries.

One or more external power interfaces 326 of power system 322 can include one or more wired-power interfaces, such as a USB cable and/or a power cord, that enable wired electrical power connections to one or more power supplies that are external to computing device 300. One or more external power interfaces 326 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 326, computing device 300 can draw electrical power from the external power source the established electrical power connection. In some examples, power system 322 can include related sensors, such as battery sensors associated with the one or more batteries or other types of electrical power sensors.

Figure 4:
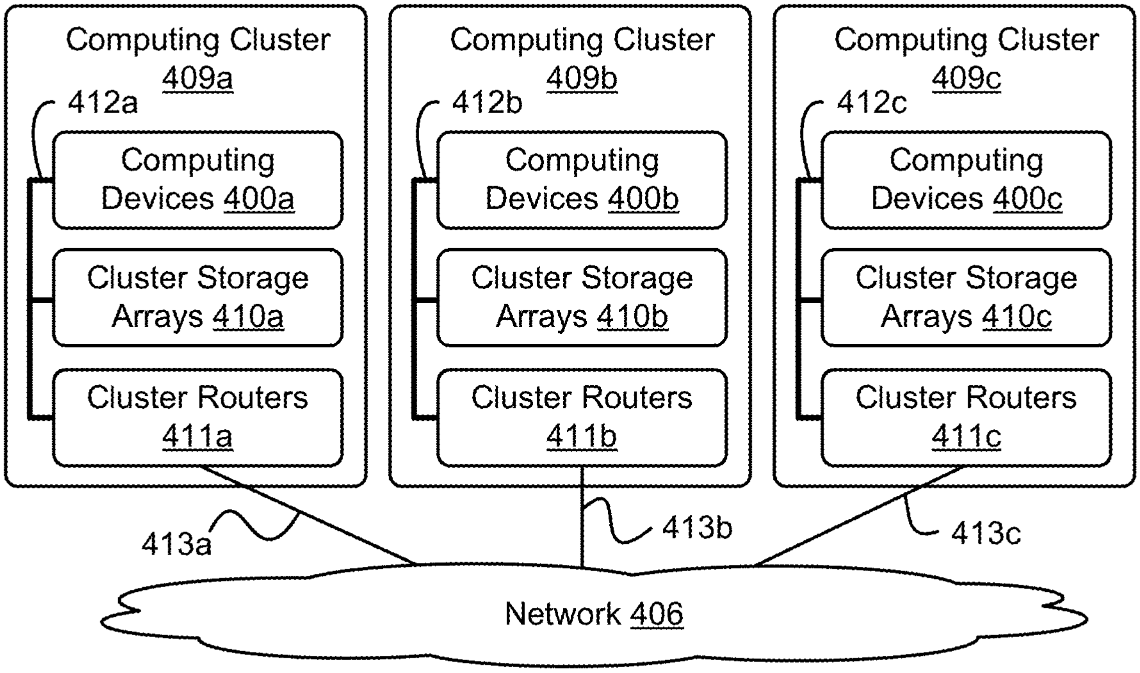
FIG. 4 depicts a network of computing clusters arranged as a cloud-based server system, in accordance with example embodiments.

FIG. 4 depicts a cloud-based server system in accordance with an example embodiment. In FIG. 4, functionality of a neural network, and/or a computing device can be distributed among computing clusters **409*a*, 409*b*, 409*c*. Computing cluster 409*a* can include one or more computing devices 400*a*, cluster storage arrays 44*a*, and cluster routers 411*a* connected by a local cluster network 412*a*. Similarly, computing cluster 409*b* can include one or more computing devices 400*b*, cluster storage arrays 44*b*, and cluster routers 411*b* connected by a local cluster network 412*b*. Likewise, computing cluster 409*c* can include one or more computing devices 400*c*, cluster storage arrays 44*c*, and cluster routers 411*c* connected by a local cluster network 412*c***.

In some embodiments, computing clusters **409*a*, 409*b*, 409*c* can be a single computing device residing in a single computing center. In other embodiments, computing clusters 409*a*, 409*b*, 409*c* can include multiple computing devices in a single computing center, or even multiple computing devices located in multiple computing centers located in diverse geographic locations. For example, FIG. 4 depicts each of computing clusters 409*a*, 409*b*, 409*c*** residing in different physical locations.

In some embodiments, data and services at computing clusters **409*a*, 409*b*, 409*c* can be encoded as computer readable information stored in non-transitory, tangible computer readable media (or computer readable storage media) and accessible by other computing devices. In some embodiments, computing clusters 409*a*, 409*b*, 409*c*** can be stored on a single disk drive or other tangible storage media, or can be implemented on multiple disk drives or other tangible storage media located at one or more diverse geographic locations.

In some embodiments, each of computing clusters **409*a*, 409*b*, and 409*c*** can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 409*a*, for example, computing devices 400*a* can be configured to perform various computing tasks of a conditioned, axial self-attention based neural network, and/or a computing device. In one embodiment, the various functionalities of a neural network, and/or a computing device can be distributed among one or more of computing devices 400*a*, 400*b*, 400*c*. Computing devices 400*b* and 400*c* in respective computing clusters 409*b* and 409*c* can be configured similarly to computing devices 400*a* in computing cluster 409*a*. On the other hand, in some embodiments, computing devices 400*a*, 400*b*, and 400*c* can be configured to perform different functions.

In some embodiments, computing tasks and stored data associated with a neural network, and/or a computing device can be distributed across computing devices 400*a*, 400*b*, and 400*c* based at least in part on the processing requirements of a neural network, and/or a computing device, the processing capabilities of computing devices 400*a*, 400*b*, 400*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 44*a*, 44*b*, 44*c* of computing clusters 409*a*, 409*b*, 409*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 400*a*, 400*b*, 400*c* of computing clusters 409*a*, 409*b*, 409*c*, various active portions and/or backup portions of these components can be distributed across cluster storage arrays 410*a*, 410*b*, 410*c*. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 411*a*, 411*b*, 411*c* in computing clusters 409*a*, 409*b*, 409*c* can include networking equipment configured to provide internal and external communications for the computing clusters. For example, cluster routers 411*a* in computing cluster 409*a* can include one or more internet switching and routing devices configured to provide (i) local area network communications between computing devices 400*a* and cluster storage arrays 410*a* via local cluster network 412*a*, and (ii) wide area network communications between computing cluster 409*a* and computing clusters 409*b* and 409*c* via wide area network link 413*a* to network 406. Cluster routers 411*b* and 411*c* can include network equipment similar to cluster routers 411*a*, and cluster routers 411*b* and 411*c* can perform similar networking functions for computing clusters 409*b* and 409*b* that cluster routers 411*a* perform for computing cluster 409*a*.

In some embodiments, the configuration of cluster routers 411*a*, 411*b*, 411*c* can be based at least in part on the data communication requirements of the computing devices and cluster storage arrays, the data communications capabilities of the network equipment in cluster routers 411*a*, 411*b*, 411*c*, the latency and throughput of local cluster networks 412*a*, 412*b*, 412*c*, the latency, throughput, and cost of wide area network links 413*a*, 413*b*, 413*c*, and/or other factors that can contribute to the cost, speed, fault-tolerance, resiliency, efficiency and/or other design criteria of the moderation system architecture.

Figure 5:
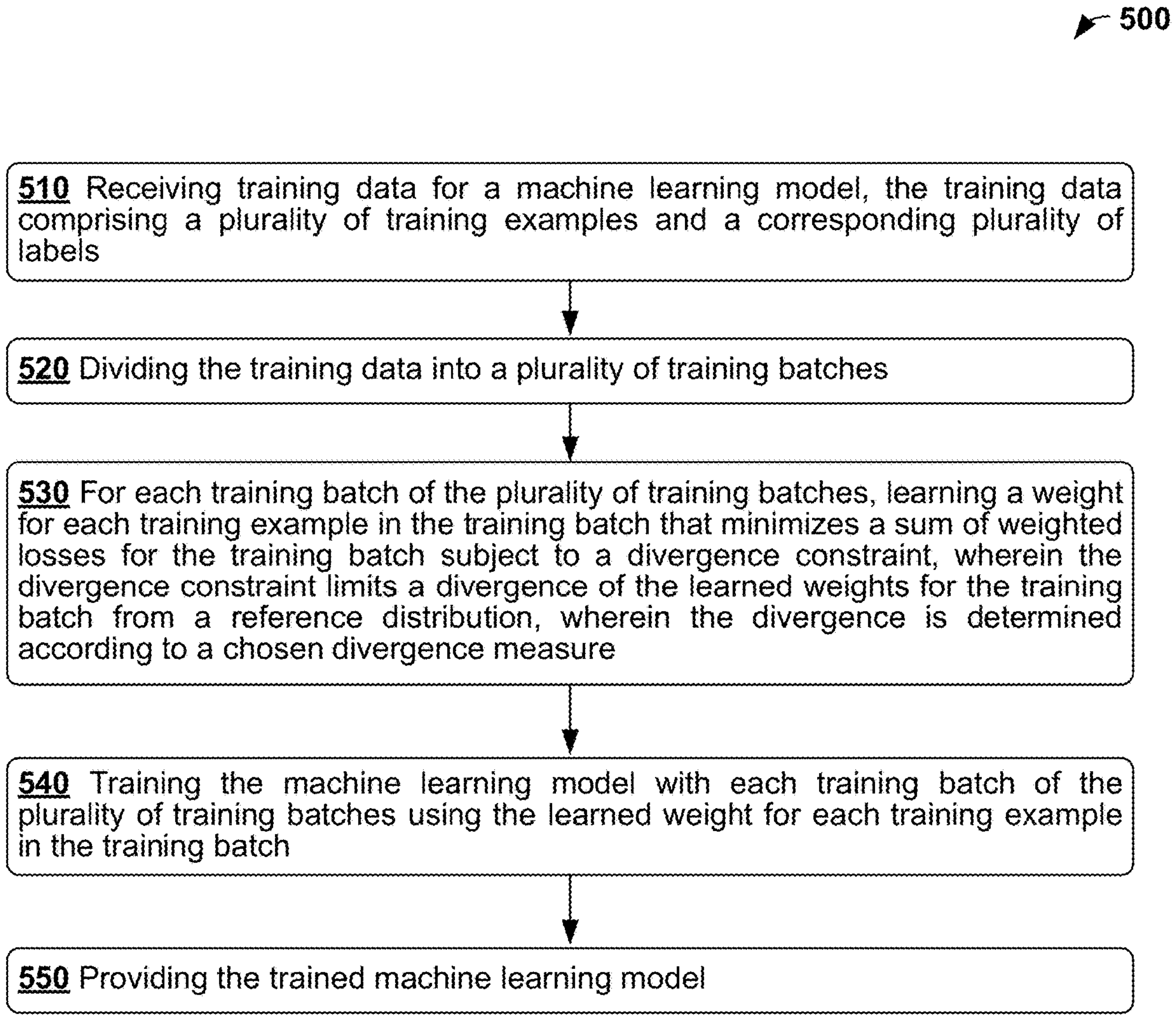
FIG. 5 is a flowchart of a method, in accordance with example embodiments.

FIG. 5 is a flowchart of a method 500, in accordance with example embodiments. Method 500 can be executed by a computing device, such as server device 208-210 or computing device 300. Method 500 can begin at block 510, where the computing device receives training data for a machine learning model. The training data includes a plurality of training examples and a corresponding plurality of labels. In some examples, the training data includes noisy labels.

At block 520, the computing device divides the training data into a plurality of training batches. Each training batch may include a portion of the training examples and corresponding labels. In some examples, the training batches may be minibatches which are one or more orders of magnitude smaller in size than the entire training data.

At block 530, the computing device learns, for each training batch of the plurality of training batches, a weight for each training example in the batch. For each training batch, the learned weights minimize a sum of weighted losses for the training batch subject to a divergence constraint, where the divergence constraint limits a divergence of the learned weights for the training batch from a reference distribution. The divergence may be determined according to a chosen divergence measure. In some examples, for each training batch of the plurality of training batches, the divergence constraint limits the divergence of the learned weight for the training batch from the reference distribution to be within a delta value. In some examples, the delta value is a hyperparameter that is tuned while training the machine learning model. In some examples, the reference distribution is a uniform distribution assigning an equal weight to each training example within each training batch. Some examples further involve receiving group prior information indicative of likelihood of label noise for a group of training examples within a particular training batch, and determining the reference distribution for the particular training batch based on the group prior information. In some examples, the chosen divergence measure comprises an $f$-divergence measure. In some examples, the chosen divergence measure comprises a KL-divergence measure. In some examples, the chosen divergence measure comprises a reverse KL-divergence measure. In some examples, the chosen divergence measure comprises an alpha-divergence measure.

In some examples, the computing device learns, for each training batch of the plurality of training batches, the weight for each training example in the training batch by learning a class weight for each class of a plurality of classes for each training example in the training batch. In some examples, the computing device learns, for each training batch of the plurality of training batches, the weight for each training example in the training batch that minimizes the sum of weighted losses for the training batch subject to a class divergence constraint. The class divergence constraint limits a class divergence of the class weight determined for each class of the plurality of classes for each training example in the training batch from a one-hot vector that assigns full weight to a single class. In some examples, the class divergence is measured using a total variation distance. In some examples, the class divergence is measured using a squared L2-distance.

At block 540, the computing device trains the machine learning model with each training batch of the plurality of training batches using the learned weight for each training example in the training batch. In some examples, the computing devices discards from a computer memory, for each training batch of the plurality of training batches, the weight learned for each training example in the training batch after training the machine learning model with the training batch.

At block 550, the computing device provides the trained machine learning model.

Some examples further involve the computing device using the weight learned for each training example in a particular training batch for mixing training examples from the particular training batch to create a mixed up minibatch for training the machine learning model. Some examples further involve the computing device using the weight learned for each training example in the particular training batch for sampling training examples from the particular training batch to create the mixed up minibatch for training the machine learning model. In some examples, the mixed up minibatch is used to train the machine learning model for processing images.

Figure 6:
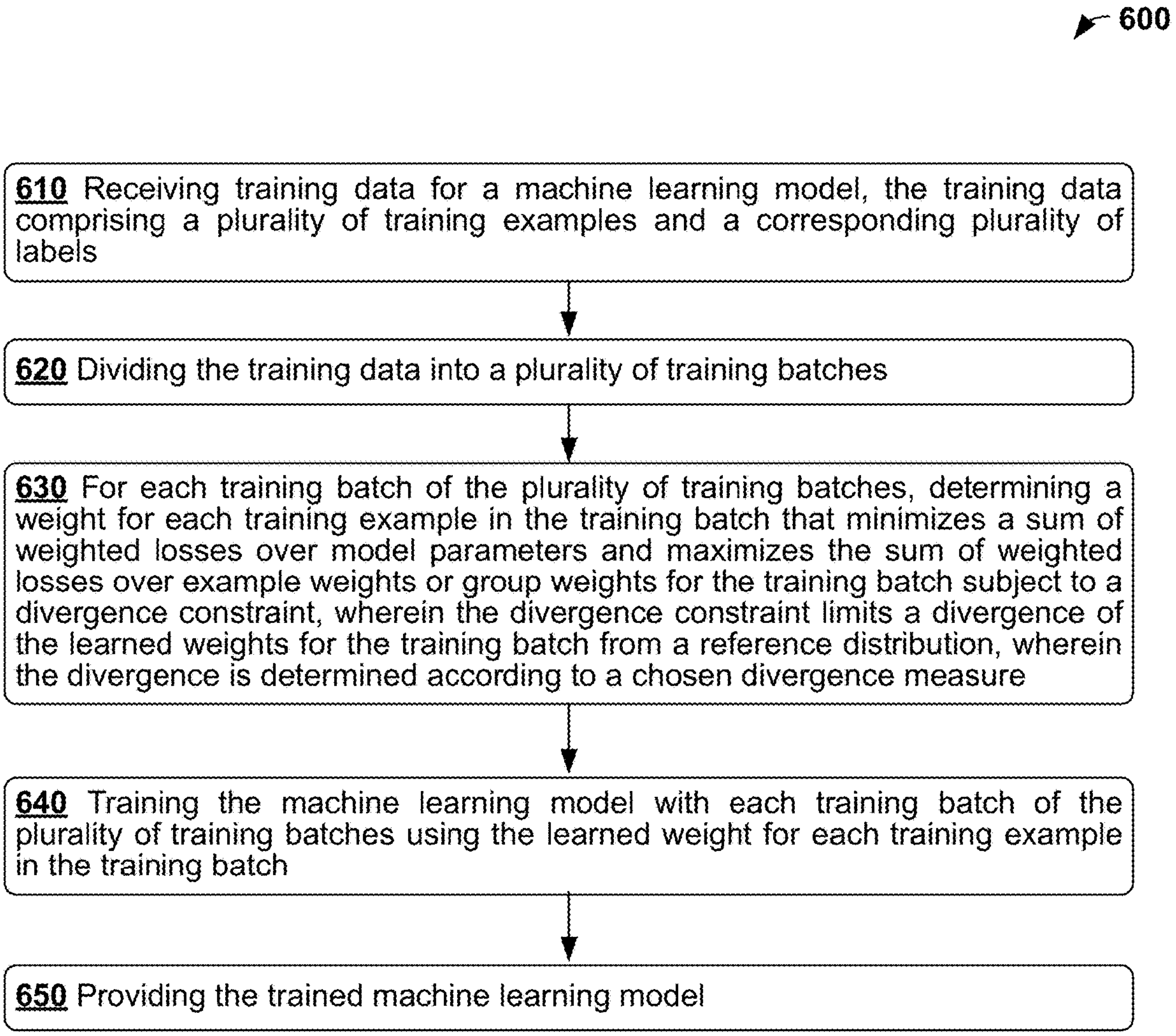
FIG. 6 is a flowchart of another method, in accordance with example embodiments.

FIG. 6 is a flowchart of a method 600, in accordance with example embodiments. Method 600 can be executed by a computing device, such as server device 208-210 or computing device 300. Method 600 can begin at block 610, where the computing device receives training data for a machine learning model. The training data includes a plurality of training examples and a corresponding plurality of labels. In some examples, the training data includes hard-to-learn examples that can be prioritized to optimize training of the machine learning model.

At block 620, the computing device divides the training data into a plurality of training batches. Each training batch may include a portion of the training examples and corresponding labels. In some examples, the training batches may be minibatches which are one or more orders of magnitude smaller than the entire training data.

At block 630, the computing device learns, for each training batch of the plurality of training batches, a weight for each training example in the training batch. For each training batch, the learned weights minimize a sum of weighted losses over model parameters and maximize the sum of weighted losses over example weights or group weights for the training batch subject to a divergence constraint, where the divergence constraint limits a divergence of the learned weights for the training batch from a reference distribution. The divergence may be determined according to a chosen divergence measure. In some examples, for each training batch of the plurality of training batches, the divergence constraint limits the divergence of the learned weights for the training batch from the reference distribution to be within a delta value. In some examples, the delta value is a hyperparameter that is tuned while training the machine learning model. In some examples, the reference distribution is a uniform distribution assigning an equal weight to each training example within each training batch. Some examples further involve receiving group prior information indicative of likelihood of label noise for a group of training examples within a particular training batch, and determining the reference distribution for the particular training batch based on the group prior information. In some examples, the chosen divergence measure comprises an $f$-divergence measure. In some examples, the chosen divergence measure comprises a KL-divergence measure. In some examples, the chosen divergence measure comprises a reverse KL-divergence measure. In some examples, the chosen divergence measure comprises an alpha-divergence measure.

In some examples, the computing device learns, for each training batch of the plurality of training batches, the weight for each training example in the training batch by learning a class weight for each class of a plurality of classes for each training example in the training batch. In some examples, the computing device learns, for each batch of the plurality of batches, the weight for each training example in the training batch that minimizes the sum of weighted losses for the training batch subject to a class divergence constraint. The class divergence constraint limits a class divergence of the class weight determined for each class of the plurality of classes for each training example in the training batch from a one-hot vector that assigns full weight to a single class. In some examples, the class divergence is measured using a total variation distance. In some examples, the class divergence is measured using a squared L2-distance.

At block 640, the computing device trains the machine learning model with each training batch of the plurality of training batches using the learned weight for each training example in the training batch. In some examples, the computing devices discards from a computer memory, for each batch of the plurality of training batches, the weight determined for each training example in the training batch after training the machine learning model with the training batch.

At block 650, the computing device provides the trained machine learning model.

Example Systems and Methods

Examples described herein involve the classic supervised learning regime (although it is possible to extend the method to other settings such as semi-supervised learning). We use $x_i \in \mathbb{R}^d$ to denote ith training example with its corresponding annotated label $y_i \in \{1, \ldots, K\}$, and use $\theta$ to denote model parameters. Let $L(x_i, y_i, \theta)>0$ be the loss for ith example, for which we will use a shorthand of $L(x_i, \theta)$ for simplicity of notation. We assume that an unknown subset of the training examples has noisy labels (i.e., $y_i$ is not the true class). To address this label noise, we propose to reweight the training examples by assigning nonnegative weight $w_i$ to each example $x_i$. We restrict the weights in a minibatch to constitute a distribution (i.e., sum to 1) and constrain their deviation from a reference distribution to be within $\delta$. In the absence of any prior knowledge, we take the reference distribution to be uniform. This leads us to the optimization problem (1):

$$\min_{w,\theta} \sum_i w_i L(x_i, \theta), \text{ s.t. } D(u, w) \leq \delta, \sum_i w_i = 1, w_i \geq 0,$$

where $D(\cdot,\cdot)$ is a divergence measure of choice and u denotes the uniform distribution. Next, we look into this objective more closely and derive updates for importance weights w for several commonly used divergence measures.

$f$-Divergence

Let us take D to be $f$-divergence. For simplicity, we work with the constraint $D(w,u)=\Sigma_i u_i f(w_i/u_i) \leq \delta$ where $f$ is a convex function with $f(1)=0$ (instead of a constraint on D(u,w) which will not lead to simple closed form update rules). Forming the Lagrangian for problem (1), we get equation (2):

$$\sum_i w_i L(x_i, \theta) + \lambda(D(w, u) - \delta) + \mu\left(\sum_i w_i - 1\right) - \sum v_i w_i,$$

where $\lambda \geq 0$, $v_i \geq 0$, $\mu$ are the Lagrange multipliers. The dual function (for a fixed $\theta$) is given by equation (3):

$$h(\lambda, \mu, v) = \min_w \sum_i w_i L(x_i, \theta) + \lambda(D(w, u) - \delta) + \mu\left(\sum_i w_i - 1\right) - \sum_i v_i w_i.$$

Optimizing over w, the first order condition for optimality is equation (4):

$$L(x_i, \theta) + \lambda f'\left(\frac{w_i}{u_i}\right) + \mu - v = 0 \Rightarrow$$

$$w_i = u_i f'^{-1}\left(\frac{-L(x_i, \theta) - \mu + v_i}{\lambda}\right) = \frac{1}{n} f'^{-1}\left(\frac{-L(x_i, \theta) - \mu + v_i}{\lambda}\right).$$

The Lagrange multipliers $\lambda$, $\mu$, and $v_i$ are such that the constraints are satisfied. We adopt an alternating minimization approach for optimizing over $(w,\theta)$: fix $\theta$ and optimize for w using equation (4), then take a gradient step for model parameters $\theta$ while keeping the importance weights w fixed. As we define the problem (1) over a single minibatch, there is no extra overhead of maintaining the importance weights over entire training data or across the training iterations. We can also obtain closed form solutions for the importance weights when D is taken to be in the family of Bregman divergence.

Some Special Cases of Divergence Measures

We now consider some special cases of divergences that are commonly used in machine learning.

KL Divergence

KL-divergence belongs to both $f$-divergence and Bregman divergence family, and is given by $$D(w, u) = KL(w, u) = \sum_i w_i \log\frac{w_i}{u_i}.$$

It can be obtained by taking the generating function $f(t)=t \log t$ in $f$-divergence, which in turn implies $f'^{-1}(t)=e^{t-1}$. Since $f'^{-1}(t)=e^{t-1}>0$ for all finite t, all weights are non-zero and we will have $v_i=0$. Hence, based on equation (4), the weights are given by equation (5):

$$w_i = \frac{1}{n}\exp\left(-\frac{L(x_i, \theta) + \mu}{\lambda} - 1\right) = \frac{\exp\left(-\frac{L(x_i, \theta)}{\lambda}\right)}{\sum_j \exp\left(-\frac{L(x_j, \theta)}{\lambda}\right)}.$$

The second equality above is obtained by using the fact that $\Sigma_i w_i=1$. The Lagrange multiplier $\lambda$ is such that the constraint $D(w,u) \leq \delta$ is active. In our experiments, we use $\lambda$ as the tunable hyperparameter instead of $\delta$.

Reverse-KL Divergence

Reverse-KL divergence also belongs to both $f$-divergence and Bregman divergence family, and is given by $$D(w, u) = KL(u, w) = \sum_i u_i \log\frac{u_i}{w_i}.$$

It can be obtained by taking the generating function $f(t)=-\log t$ in $f$-divergence, which in turn implies $$f'^{-1}(t) = -\frac{1}{t}.$$

Since a zero weight will result in unbounded reverse-KL divergence and violate the constraint, all weights have to be positive and we will have $v_i=0$. Hence, based on equation (4), the weights are given by equation (6):

$$w_i = \frac{1}{n}\frac{\lambda}{L(x_i, \theta) + \mu} = \frac{1/(L(x_i, \theta) + \mu)}{\sum_j 1/(L(x_j, \theta) + \mu)}.$$

Again, the second equality above is obtained by using the fact that $\Sigma_i w_i=1$. The Lagrange multiplier $\mu$ is such that the constraint $D(w,u) \leq \delta$ is active. In our experiments, we use $\mu$ as the tunable hyperparameter instead of $\delta$.

Other α-Divergences and Generalized Softmax

α-divergence parameterized by $\alpha \in \mathbb{R}$ is a class of $f$-divergence which is commonly used in machine learning. The α-divergence is induced by the generating convex function $$f_\alpha(t) = \frac{1}{\alpha(1-\alpha)}(t - t^\alpha)$$

for $\alpha \in \mathbb{R}\backslash\{0,1\}$, $f_0(t)=-\log t$ and $f_1(t)=t \log t$. α-divergence recovers many well-know divergences for different values of α, including Neyman-$\chi^2$ ($\alpha=-1$), Reverse-KL ($\alpha=0$), Hellinger ($\alpha=0.5$), KL ($\alpha=1$), and Pearson-$\chi^2$ ($\alpha=2$). As we already handle the case of $\alpha=0$ and $\alpha=1$ in the previous sections, we focus on $\alpha \in \mathbb{R}\backslash\{0,1\}$. We have $$f'(t) = -\frac{1}{1-\alpha}t^{\alpha-1}$$

which yields the inverse function $$f'^{-1}(t) = ((\alpha - 1)t)^{\frac{1}{\alpha-1}}.$$

Based on equation (4) and the form of the inverse function, the constraint $w_i \geq 0$ may become active for values of $\alpha>1$, thus the Lagrange multiplier $v_i$ causing the weight to be zero. As a result, the weights are given by equation (7):

$$w_i = \frac{[(1-\alpha)L(x_i, \theta) + \mu]_+^{1/(\alpha-1)}}{\sum_j [(1-\alpha)L(x_j, \theta) + \mu]_+^{1/(\alpha-1)}}, \alpha \neq 1,$$

where $[\bullet]_+=\max(\bullet,0)$. The case of $\alpha=1$ which corresponds to KL divergence is given in equation (5). Equation (7) can alternatively be viewed in the form of a generalized softmax function. Using the definition of the generalized exponential function $$\exp_s(t) := [1 + (1 - s)t]_+^{\frac{1}{1-s}},$$

$s \in \mathbb{R}\setminus\{1\}$ and $\exp_1(t)=\exp(t)$, we can also write the weights as $$w_i = \frac{\exp_{(2-\alpha)}\left(-\frac{L(x_i, \theta)}{\mu}\right)}{\sum_j \exp_{(2-\alpha)}\left(-\frac{L(x_j, \theta)}{\mu}\right)}.$$

As we decrease $\alpha$, the distribution of weights will have heavier tails (i.e., the difference between the weights for large and small losses will be less, resulting in a flatter distribution). Similarly for a fixed $\alpha$, we will see heavier tails with increasing $\mu$. We illustrate this behavior in FIGS. 7 and 8.

Figure 7:
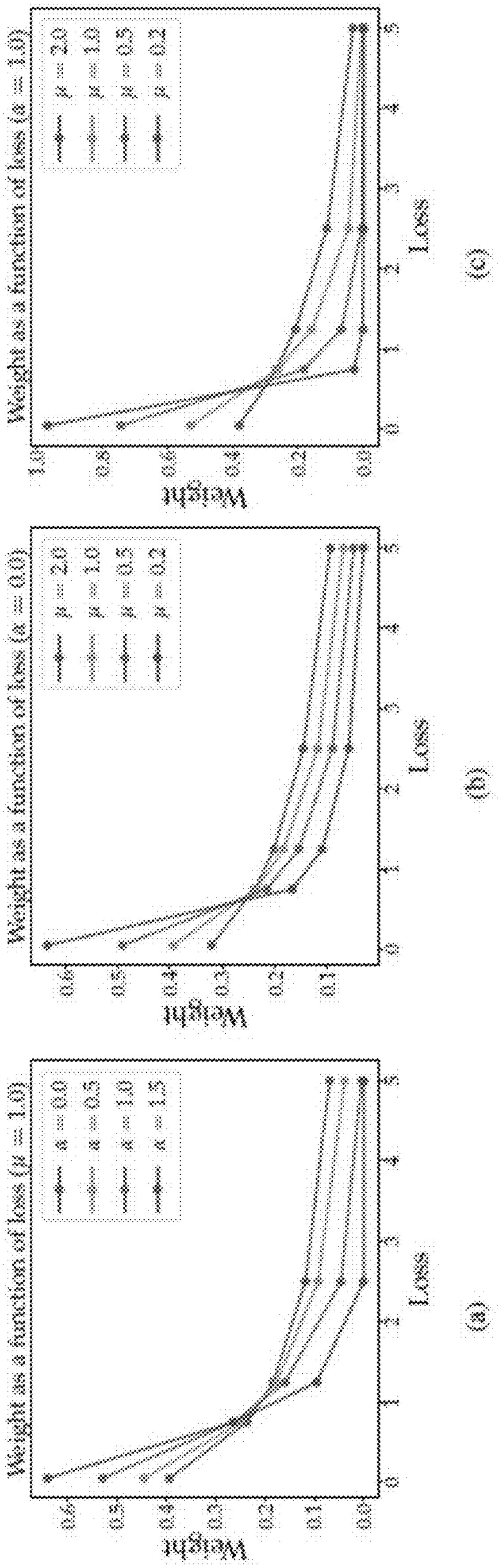
FIG. 7 illustrates distribution of weights as a function of loss, in accordance with example embodiments.

FIG. 7 illustrates distribution of weights as a function of loss. We sample five loss values on the X-axis and plot the weights with different divergences and parameter $\mu$. Plot (a) shows the effect of different values of $\alpha$ for fixed $\mu=1$. The distribution has a heavier-tail for smaller $\alpha$ values, while $\alpha>1$ clips the weights to zero for larger losses. Plot (b) shows the effect of different values of $\mu$ for fixed $\alpha=0$. The weights become smoother for larger $\mu$. Plot (c) shows a similar plot for $\alpha=1$. Larger $\mu$ values have the same effect, however, the tail of the distribution is much shorter than the previous case.

Figure 8:
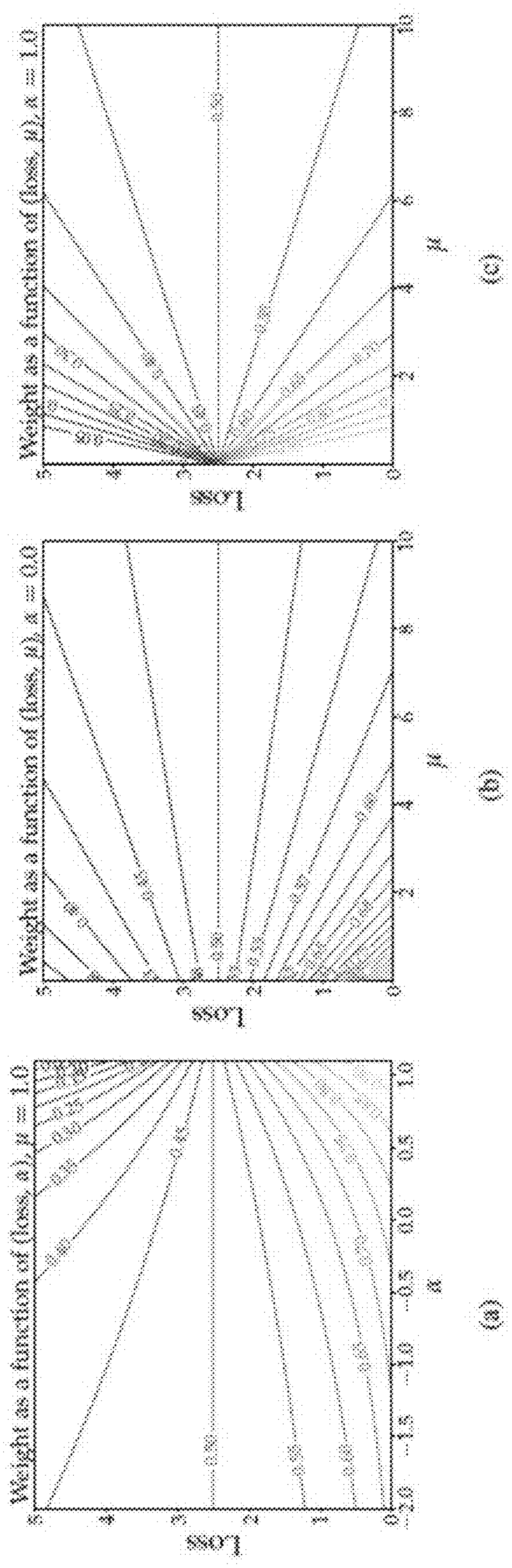
FIG. 8 illustrates level sets of weights as a function of loss, in accordance with example embodiments.

FIG. 8 illustrates level sets of the weight of an example as a function of its loss in a batch size of 2, where the loss of the other example is fixed to 2.5. The horizontal line passing through the middle corresponds to a value of loss equal to 2.5, thus having instance weight=0.5. Points above this line (with loss>2.5) induce weights<0.5 and vice versa. Plot (a) shows the effect of different $\alpha$ for a fixed $\mu=1$. The level sets are asymmetric across the center line. Also, the level sets become denser along a vertical slice for larger $\alpha$, as the distribution becomes less smooth. Plot (b) shows the effect of $\mu$ for a fixed $\alpha=1$. The level sets are again asymmetric across the center line and become denser for smaller $\mu$. Plot (c) shows a similar plot for $\alpha=1$. The change in level sets is more rapid as the distribution has shorter tail.

Figure 9:
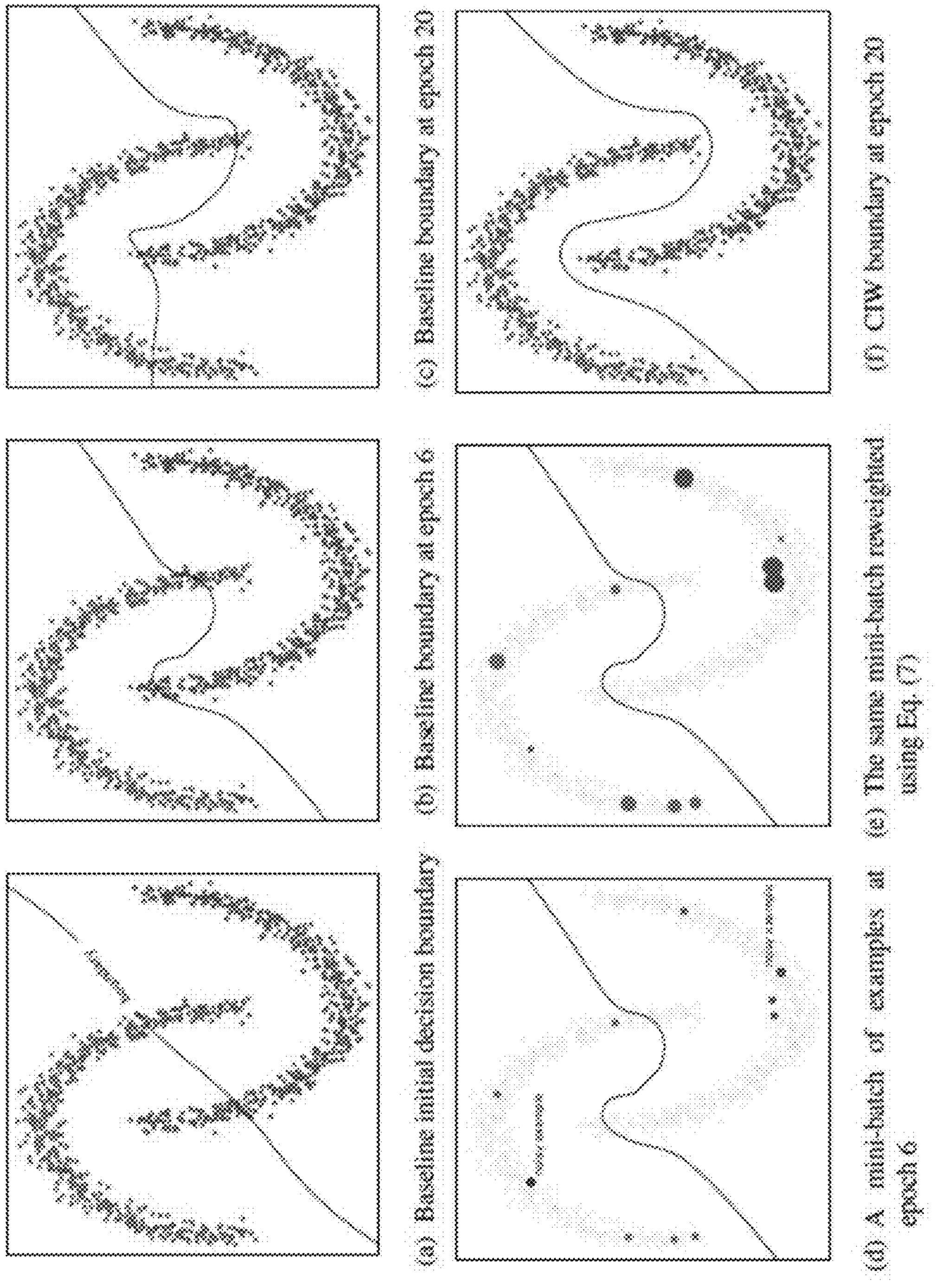
FIG. 9 illustrates a constrained importance reweighting method on a two-layer neural network, in accordance with example embodiments.

We also show the effect of our instance reweighting approach in a toy noisy binary classification setting in two dimensions. We use a two-layer fully-connected neural network with tan h activations and 10 and 20 hidden layers, respectively. The model is trained on 1000 samples with 30% random flip label noise. FIG. 9 visualizes the decision boundary of the baseline model, trained with the CE loss, as well as with the reweighted loss via equation (7) (using $\alpha=0.5$ and $\mu=0.5$). Our importance reweighting approach is able to successfully rectify the decision boundary by emphasizing on the clean examples in each batch while down-weighting the noisy ones.

FIG. 9 shows our proposed constrained importance reweighting method on a two-layer neural network. Plot (a) shows the decision boundary at the beginning of training. Plot (b) shows the decision boundary of the baseline model after 6 epochs. Plot (c) shows the decision boundary of the baseline model after 20 epochs. The large loss of the misclassified noisy examples causes the model to eventually overfit to noise. Plot (d) shows a random mini-batch of examples at epoch 6. The baseline model treats these examples as equally important. Plot (e) shows the same mini-batch of examples reweighted by our proposed approach (with size of each example indicating its importance). Plot (f) shows that b activating the proposed instance reweighting at epoch 6, the model is able to fit well to the geometry of the data at epoch 20.

Constrained Class Reweighting

Instance reweighting presented in the earlier sections assigns high weights to instances with lower losses while not deviating far from a uniform distribution over instances. In this section, we extend this intuition to assign importance weights over all possible class labels. For the mislabeled examples, it is reasonable to assign non-zero weights to classes that could potentially be the true label. Let us denote by $L_j(x_i,\theta)$ the loss for example $x_i$ with the assumption that the true label is class j, i.e., $L_j(x_i,\theta):=L(x_i,j,\theta)$ (note that we used $L(x_i,\theta)$ to denote $L(x_i,y_i,\theta)$ in the earlier sections, where $y_i$ was the annotated label). We now consider optimization problem (8):

$$\min_{w,v,\theta} \sum_i w_i \left[\sum_j v_{ij} L_j(x_i, \theta)\right], \text{ s.t. } D_1(u, w) \le \delta, \sum_i w_i = 1, w_i \ge 0,$$
$$D_2(e_i, v_i) \le \gamma \forall_i, \sum_j v_{ij} = 1, v_{ij} \ge 0 \forall_i,$$

where index i runs over the examples in the minibatch, index j runs over all the classes, u is the uniform distribution over examples, $v_{ij}$ is the weight for class j for ith example, $e_i$ is the one-hot vector with 1 in the position of annotated class of ith example (i.e., $y_i$). Since the inner problem for every example is independent of others, we first solve each inner problem independently to get class weights v and fix them before computing instance weights w using the earlier described closed-form solutions. Next, we consider some special cases for divergence $D_2$ and derive updates for class weights.

Total Variation

Taking $D_2$ to be the total variation distance will result in a linear program in v with solution lying on a vertex. We can rewrite the optimization problem (8) in v (omitting the example index i) as equation (9):

$$\min_v \sum_j v_j L_j(x, \theta), \text{ s.t. } \|e - v\|_1 \le \gamma, \sum_j v_j = 1, v_j \ge 0,$$

where e is a one-hot vector with $e_y=1$ and $e_j=0 \forall j \ne y$. The solution to this optimization problem subsequently reduces the objective (8) to objective (10):

$$\min_{w,\theta} \sum_i w_i \left[(1 - \gamma/2) L_{y_i}(x_i, \theta) + \gamma/2 L_{\hat{y}_i}(x_i, \theta)\right],$$
$$\text{s.t. } D_1(u, w) \le \delta, \sum_i w_i = 1, w_i \ge 0,$$

where $\hat{y}_i$ denotes the class with lowest loss. We note that this is same as static bootstrapping which was earlier proposed for label noise in a rather heuristic manner. We show that it can justified in a principled manner from the point of view of constrained optimization over class weights. It is possible to use a per-instance $\gamma_i$, perhaps making it a function of the class losses (i.e., $\gamma_i=g(L_1(x_i,\theta), \ldots, L_K(x_i,\theta))$ for some function g), but we work with a $\gamma$ that is globally fixed for all instances in our experiments for the sake of simplicity.

Other Divergences that Result in Similar Solution for Class Weights.

The effective inner loss in objective (10) is a convex combination of the two losses: loss of the annotated class $y_i$ and loss of the predicted class $\hat{y}_i$. It can be shown that similar weighting of the two losses, with weights given by $(1-g(\gamma))$ and $g(\gamma)$ for some nonnegative function g, are obtained if we take $D_2(\cdot,\cdot)$ to be $\ell_\infty$, distance, reverse-KL divergence, or reverse $f$-divergence. Since the reference distribution for class reweighting, $e_i$, is one-hot, the ratio divergences such as $f$-divergences will result in one-hot v for any finite $\gamma$. However, it is possible to do label smoothing so that $e_i$ has support over all classes and then use $f$-divergences. This will result in a loss-adaptive version of label smoothing.

$\ell_2$-Distance

We now take $D_2$ to be the squared $\ell_2$-distance and consider problem (11):

$$\min_v \sum_j v_j L_j(x,\theta), \text{ s.t. } \|e-v\|_2^2 \le \gamma, \sum_j v_j = 1, v_j \ge 0,$$

The solution to this can be obtained by sorting the losses $$\{L_j(x,\theta)\}_{j=1}^k$$

in ascending order and doing a search for the nonzero indices of v over the possible solution set $S=\{[m]\cup\tilde{y}\}_{1\le m<\tilde{y}}$, where $[m]=\{1, \ldots, m\}$, and $\tilde{y}$ denotes the index where the loss $L_y(x,\theta)$ falls in this ranking of losses. The number of candidate solutions are $\tilde{y}$ and the correct solution can be identified by checking certain conditions. A first heuristic that often provided correct solutions in our experiments was to compute the mean $\tilde{\mu}$ of the losses $\{L_j(x,\theta):L_j(x,\theta)\le L_y(x,\theta)\}$ and set the nonzero indices of v to be $\{j:L_j(x,\theta)<\tilde{\mu}\}\cup\{y\}$. Since the problem (11) is convex, we can also use a convex solver to solve for v. However, this gives us an interesting insight behind the working of the $\ell_2$-distance constraint, i.e., it spreads the mass of the weight vector v more broadly to classes with low losses than the total variation distance which only allots the mass to the class with least loss.

Using Importance Weights with Mixup

Mixup has been shown to work well in the presence of label noise. We propose two ways to combine Mixup with the instance weights obtained with our method that further provide significant empirical gains against label noise:

(i) Using importance weights for mixing (IW-Mix). Let $X\in\mathbb{R}^{n\times d}$ denote a training minibatch of n examples. The ith example of the mixed up minibatch $X^{(m)}\in\mathbb{R}^{n\times d}$ is given by $$X_{i:}^{(m)} = (w_i X_{i:} + \tilde{w}_i \tilde{X}_{i:})/(w_i + \tilde{w}_i)$$

where $\tilde{w}$ and $\tilde{X}$ are obtained by applying same random permutation $\mathcal{P}$ to both w and the rows of X. The labels are also obtained by same mixing proportions. If $Y\in\mathbb{R}^{n\times k}$ is the one-hot label matrix, then the ith mixed up label is given by $$Y_{i:}^{(m)} = (w_i Y_{i:} + \tilde{w}_i \tilde{Y}_{i:})/(w_i + \tilde{w}_i),$$

where $\tilde{Y}$ is the obtained by applying the same permutation $\mathcal{P}$ to Y.

(ii) Using importance weights for both sampling and mixing (SIW-Mix). In this variant, we importance sample the example indices (with replacement) in the minibatch using instance weights w as probabilities. For the importance sampled indices I, let $\tilde{w}=w[I]$, $\tilde{X}=X[I,:]$ and $\tilde{Y}=Y[I,:]$. We then construct the mixed up minibatch as earlier, i.e., $$X_{i:}^{(m)} = (w_i X_{i:} + \tilde{w}_i \tilde{X}_{i:})/(w_i + \tilde{w}_i) \text{ and } Y_{i:}^{(m)} = (w_i Y_{i:} + \tilde{w}_i \tilde{Y}_{i:})/(w_i + \tilde{w}_i).$$

Using the Mixed Up Batch

There are two ways we can use the mixed up batch during training: (i) Mixup-base: Simply compute the base loss L $$(x_i^{(m)}, y_i^{(m)}, \theta)$$

for each mixed up example $$(x_i^{(m)}, y_i^{(m)})$$

and use the average loss $$\frac{1}{n}\sum_i L(x_i^{(m)}, y_i^{(m)}, \theta)$$

for backpropagation, (ii) Mixup-reweight: Use the losses for mixed up examples $$\{L(x_i^{(m)}, y_i^{(m)}, \theta)\}_{i=1}^n$$

as our base losses and plug them into the problem (8), recompute the instance and class weights for the mixed up examples, and use the final reweighted loss for backpropagation.

Robust Learning

Here we consider the setting that all samples are valid but there are some hard examples, and we would like the model to do well on these examples too. We consider the following optimization problem (12) to this end:

$$\min_\theta \max_w \sum_{i=1}^n \frac{(1-w_i)}{n-1} L(x_i,\theta), \text{ s.t. } D(u,w)\le\delta, \sum_i w_i = 1, w_i \ge 0$$

where $D(\cdot,\cdot)$ is a divergence measure of choice (e.g., KL) and $\delta$ is a scalar radius parameter that is fixed a priori or can be varied as learning proceeds. If we take $D(\cdot,\cdot)$ to be KL or reverse KL divergence as earlier, the updates have similar form. Specifically, for KL divergence, we can write optimal $w_i$ in terms of Lagrange multipliers as $$w_i = \frac{\lambda}{n\left(L(x_i,\theta)/(n-1)-\mu\right)} = \frac{\lambda(n-1)/n}{L(x_i,\theta)-\mu(n-1)},$$

where $\lambda \geq 0$.

When D(•,•) is reverse KL divergence, we have $$w_i = \frac{\exp\left(\frac{-L(x_i,\theta)}{\lambda(n-1)}\right)}{\sum_j \exp\left(\frac{-L(x_j,\theta)}{\lambda(n-1)}\right)}$$

When $L(x,\theta)$ is supervised cross entropy loss, i.e., $L(x_i,\theta)=-\log p_{t_i}$ where $p_{t_i}=p_i$ for $y_i=1$ and $p_{t_i}=(1-p_i)$ for $y_i=0$ ($p_i$ being the predicted probability of positive class), the weights are given by $$w_i \propto p_{t_i}^{\gamma},$$

with $\gamma=1/\lambda(n-1)$. The weight for ith example is proportional to $$\left(1-\kappa p_{t_i}^{\gamma}\right),$$

where $$\kappa = 1/\sum_j p_{t_j}^{\gamma}.$$

This can be contrasted with the Focal loss where the example weight is given by $(1-p_{t_i})^{\gamma}$ for a hyperparameter $\gamma$.

Alternative to the optimization problem (12), if we consider the following optimization problem (13):

$$\min_\theta \max_w \sum_{i=1}^{n} w_i L(x_i,\theta), \text{ s.t. } D(u,w) \leq \delta, \sum_i w_i = 1, w_i \geq 0,$$

we will get the following weights for the KL divergence constraint:

$$w_i = \frac{-\lambda}{n(L(x_i,\theta)+\mu)}$$

The Lagrange multiplier $\mu$ will take value to ensure $L(x_i,\theta)+\mu<0$ so that $w_i \geq 0$. For reverse KL divergence constraint, optimal weights for problem (13) will be $$w_i = \frac{\exp\left(\frac{L(x_i,\theta)}{\lambda}\right)}{\sum_j \exp\left(\frac{L(x_j,\theta)}{\lambda}\right)}$$

For supervised cross-entropy loss, this will imply $$w_i \propto p_{t_i}^{-\gamma}, \gamma = \frac{1}{\lambda} > 0$$

This highlights that we can get very different example weighting schemes $$\left(\left(1-\kappa p_{t_i}^{\gamma}\right) vs. p_{t_i}^{-\gamma}\right)$$

by parameterizing the problem in different ways.

Un-Normalized Divergence

In further examples, we can do away with the constraint that all weights sum to 1 and use unnormalized KL divergence. For unnormalized reverse KL divergence constraint, the weights for problem (12) are given by $$w_i = \exp\left(-\frac{L(x_i,\theta)}{\lambda(n-1)}\right)$$

For supervised cross entropy loss, this reduces example weights equal to $$(1-w_i) = \left(1-p_{t_i}^{\gamma}\right)$$

with $\gamma=1/\lambda(n-1)$, where $p_{t_i}=p_i$ for $y_i=1$ and $p_{t_i}=(1-p_i)$ for $y_i=0$ ($p_i$ being the predicted probability of positive class). This can be contrasted with the Focal loss where the example weight is given by $(1-p_{t_i})^{\gamma}$ for a hyperparameter $\gamma$.

Learning with Noisy Labels Under Group Priors

In the cases where we have prior information about certain groups in the training data that are less or more likely to have label noise, this prior can be incorporated in our sample reweighting framework by modifying the uniform prior over examples to a more suitable distribution. For example, if certain group or class is believed to have less amount of label noise, the prior can be modified to be $\tilde{\mu}$ with $$\tilde{u}_i > \frac{1}{n}$$

for all example indices $\tilde{i}$ belonging to this group or class, while still constraining $\tilde{\mu}$ to be a distribution (i.e., $\Sigma_i\tilde{\mu}_i=1$). Similarly, if certain group or class is believed to have more amount of label noise, the prior can be modified to be $\tilde{\mu}$ with $$\tilde{u}_i < \frac{1}{n}$$

for all example indices $\tilde{i}$ belonging to this group or class, while still constraining $\tilde{\mu}$ to be a distribution (i.e., $\Sigma_i\tilde{\mu}_i=1$). If there is an ordering available over groups in terms of their likeliness of having label noise, this ordering can also be reflected in the prior $\tilde{\mu}$. All derivations previously described can be easily adapted to the modified prior by plugging in the new prior weights $\tilde{u}_i$.

Robust Learning Over Groups

There are scenarios where data can be naturally partitioned into groups and the goal is to learn a robust classifier that works well on all these groups. This grouping information can be available as part of metadata (e.g., face images that have skin or hair color as metadata). In such cases we want to ensure or encourage equity in the performance of the learned model over different groups, instead of optimizing for the average performance over full dataset. Our robust learning via sample reweighting framework can be easily adapted to this scenario. Specifically, we consider the following optimization problem (14) (modifying the problem (12)):

$$\min_{\theta}\max_{g}\sum_{i=1}^{k}\frac{(1-g_i)}{k-1}L_i(\theta),\ \text{s.t. } D(u,g)\le\delta,\ \sum_i g_i=1,\ g_i\ge 0$$

where k is the total number of groups, g is a discrete distribution over groups (to be learned), u is a prior distribution over groups (e.g., uniform), D(•,•) is a divergence measure of choice (e.g., KL), and δ is a scalar radius parameter that is fixed a priori or can be varied as learning proceeds. The loss $L_i(\theta)=\Sigma_{j\in G_i}L(x_j,\theta)$ is the loss of examples belonging to the group $G_i$. Having δ to be 0 will reduce the objective to that of empirical risk minimization (ERM) when u is the uniform distribution. The solution for weights for different divergences can be derived in similar manner as previously described with $L(x_i,\theta)$ replaced with $L_i(\theta)$ and n replaced with k.

We can similarly modify the objective of problem (13) for the group robust setting to produce optimization problem (15) as follows:

$$\min_{\theta}\max_{g}\sum_{i=1}^{k}g_iL_i(\theta),\ \text{s.t. } D(u,g)\le\delta,\ \sum_i g_i=1,\ g_i\ge 0,$$

and derive the solutions for the group weights $g_i$. Again, having δ to be 0 will reduce the objective to that of empirical risk minimization (ERM) when u is the uniform distribution. Another extreme case is for δ=∞, when the objective reduces to that of group distribution robust optimization proposed earlier $$\min_{\theta}\max_{i\in\{1,2,\ldots,k\}}L_i(\theta)$$

where i indexes over all k groups. Our framework provides a principled approach to control the intensity of the worst case optimization by having stochasticity over the groups via group weights $g_i$.

In addition to addressing group robustness, further examples involve addressing the class imbalance problem where the training data contains classes with highly skewed distribution. In particular, the number of training examples per class may vary significantly across classes. It may therefore be desirable to train a model that is robust to variations around a target distribution (such as uniform, or any other specified target distribution). The formulation for this problem is equivalent to the formulation for group robustness (equations (14) and 15) above) with the adjustment of replacing group-wise losses with class-wise losses.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A method comprising:

receiving training data for a machine learning model, the training data comprising a plurality of training examples and a corresponding plurality of labels;

dividing the training data into a plurality of training batches, wherein each training batch of the plurality of training batches comprise a respective plurality of training examples of the training data;

for each training batch of the plurality of training batches, learning an importance weight for each training example in the training batch that minimizes a sum of weighted losses for the training batch subject to a divergence constraint, wherein the divergence constraint limits a divergence of the learned importance weights for the training batch from a reference distribution, wherein the divergence is determined according to a chosen divergence measure;

training the machine learning model with each training batch of the plurality of training batches using the learned importance weight for each training example in the training batch; and providing the trained machine learning model.

2. The method of claim 1, further comprising for each training batch of the plurality of training batches, discarding, from a computer memory, the learned importance weights for the training batch after training the machine learning model with the training batch.

3. The method of claim 1, wherein for each training batch of the plurality of training batches, the divergence constraint limits the divergence of the learned importance weights for the training batch from the reference distribution to be within a delta value.

4. The method of claim 3, wherein the delta value is a hyperparameter that is tuned while training the machine learning model.

5. The method of claim 1, wherein the reference distribution is a uniform distribution assigning an equal importance weight to each training example within each training batch.

6. The method of claim 1, further comprising:

receiving group prior information indicative of likelihood of label noise for a group of training examples within a particular training batch; and determining the reference distribution for the particular training batch based on the group prior information.

7. The method of claim 1, wherein the chosen divergence measure comprises an $f$-divergence measure.

8. The method of claim 1, wherein the chosen divergence measure comprises a KL-divergence measure.

9. The method of claim 1, wherein the chosen divergence measure comprises a reverse KL-divergence measure.

10. The method of claim 1, wherein the chosen divergence measure comprises an alpha-divergence measure.

11. The method of claim 1, wherein for each training batch of the plurality of training batches, learning the importance weight for each training example in the training batch comprises learning a class importance weight for each class of a plurality of classes for each training example in the training batch.

12. The method of claim 11, wherein for each training batch of the plurality of training batches, learning the importance weight for each training example in the training batch that minimizes the sum of weighted losses for the training batch is further subject to a class divergence constraint, wherein the class divergence constraint limits a class divergence of the class weight learned for each class of the plurality of classes for each training example in the training batch from a one-hot vector that assigns full weight to a single class.

13. The method of claim 12, wherein the class divergence is measured using a total variation distance.

14. The method of claim 12, wherein the class divergence is measured using a squared L2-distance.

15. The method of claim 1, further comprising using the importance weight determined for each training example in a particular training batch for mixing training examples from the particular training batch to create a mixed up minibatch for training the machine learning model.

16. The method of claim 15, further comprising using the importance weight determined for each training example in the particular training batch for sampling training examples from the particular training batch to create the mixed up minibatch for training the machine learning model.

17. The method of claim 15, wherein the mixed up minibatch is used to train the machine learning model for processing images.

18. A computing system comprising one or more processors and a non-transitory computer readable medium storing program instructions executable by the one or more processors to cause performance of operations comprising:

receiving training data for a machine learning model, the training data comprising a plurality of training examples and a corresponding plurality of labels;

dividing the training data into a plurality of training batches, wherein each training batch of the plurality of training batches comprise a respective plurality of training examples of the training data;

for each training batch of the plurality of training batches, learning an importance weight for each training example in the training batch that minimizes a sum of weighted losses for the training batch subject to a divergence constraint, wherein the divergence constraint limits a divergence of the learned importance weights for the training batch from a reference distribution, wherein the divergence is determined according to a chosen divergence measure;

training the machine learning model with each training batch of the plurality of training batches using the learned importance weight for each training example in the training batch; and providing the trained machine learning model.

19. A non-transitory computer readable medium storing program instructions executable by one or more processors to cause performance of operations comprising:

receiving training data for a machine learning model, the training data comprising a plurality of training examples and a corresponding plurality of labels;

dividing the training data into a plurality of training batches, wherein each training batch of the plurality of training batches comprise a respective plurality of training examples of the training data;

for each training batch of the plurality of training batches, learning an importance weight for each training example in the training batch that minimizes a sum of weighted losses for the training batch subject to a divergence constraint, wherein the divergence constraint limits a divergence of the learned importance weights for the training batch from a reference distribution, wherein the divergence is determined according to a chosen divergence measure;

training the machine learning model with each training batch of the plurality of training batches using the learned importance weight for each training example in the training batch; and providing the trained machine learning model.

20. A method comprising:

receiving training data for a machine learning model, the training data comprising a plurality of training examples and a corresponding plurality of labels;

dividing the training data into a plurality of training batches, wherein the training batches comprise a plurality of training examples;

for each training batch of the plurality of training batches, learning an importance weight for each training example in the training batch that minimizes a sum of weighted losses over model parameters and maximizes the sum of weighted losses over example importance weights or group weights for the training batch subject to a divergence constraint, wherein the divergence constraint limits a divergence of the learned importance weights for the training batch from a reference distribution, wherein the divergence is determined according to a chosen divergence measure;

training the machine learning model with each training batch of the plurality of training batches using the learned importance weight for each training example in the training batch; and providing the trained machine learning model.

* * * * *